United States Patent Office 3,817,768
Patented June 18, 1974

3,817,768
METHOD OF PREPARING AQUEOUS DISPERSIONS OF FORTIFIED ROSIN
Paul H. Aldrich, Greenville, Del., assignor to Hercules Incorporated, Wilmington, Del.
No Drawing. Continuation of abandoned application Ser. No. 70,470, Sept. 8, 1970. This application Sept. 29, 1972, Ser. No. 293,682
Int. Cl. C08h 11/04, 11/06
U.S. Cl. 106—238                    4 Claims

ABSTRACT OF THE DISCLOSURE

Disclosed is a method of preparing an essentially stable aqueous dispersion of rosin-base material. The method involves homogenizing an unstable aqueous dispersion of rosin-base material, a relatively small amount of which is in the form of a soap, such as the sodium soap, of the rosin-base material, the soap serving as a dispersing agent for the unsaponified rosin-base material. The dispersions are useful in the sizing of paper.

---

This is a continuation of application Ser. No. 70,470, filed Sept. 8, 1970, now abandoned.

The invention relates to a novel method of preparing essentially stable aqueous dispersions of rosin-base material in finely divided form.

The aqueous dispersions prepared in accordance with this invention have particular utility in the manufacture of sized paper, papermaker's alum (aluminum sulfate) or a similar precipitating agent being usually employed in conjunction therewith to assist in precipitating the rosin-base material on the paper fibers. The dispersions of this invention can be used in internal sizing techniques and in external sizing techniques. In internal sizing, the dispersion and alum are preferably added separately to an aqueous suspension of papermaking fibers at various stages prior to sheet formation, and, in external sizing, paper sheeting is first formed, and subsequently treated by known methods, with the aqueous dispersion to provide sized paper. Aqueous dispersions prepared in accordance with this invention can be used to prepare paper products, such as paper webs, having improved resistance to penetration by water and aqueous ink.

The method of this invention comprises subjecting to extreme shear an unstable aqueous dispersion comprised of, by weight, from about 95% to about 75% water and from about 5% to about 25% solids, the solids being essentially all rosin-base material as hereinafter set forth. Preferred unstable aqueous dispersions will contain from about 90% to about 80% water and from about 10% to about 20% solids.

Rosin-base materials form the solids content of the unstable aqueous dispersions and are, by weight, from 0% to about 95% rosin and from 100% to about 5% of an adduct reaction product of rosin and an acidic compound containing the

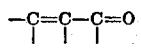

group, the amount of adducted acidic compound being from about 1% to about 20% of the total solids weight. A relative small amount of the rosin-base material is present as the soap or salt thereof. Thus there will be present either a small amount of saponified rosin or a small amount of saponified rosin adduct or a small amount of both. The amount of saponified rosin-base material present, represented as a percentage of available carboxyl groups saponified, will be from about 0.5% to about 20% and preferably from about 4% to about 10%. Preferred solids content will be, by weight, from 0% to about 85% rosin and from 100% to about 15% rosin adduct, the amount of adducted acidic compound being from about 4% to about 8%, and the amount of saponified rosin-base material present, represented as a percentage of available carboxyl groups saponified, being from about 4% to about 10%.

A convenient way to prepare the unstable aqueous dispersion is to mix together the desired amount of water; the desired amount of rosin-base material; and an alkaline material, such as sodium hydroxide, in an amount sufficient to form the desired amount of saponified rosin-base material. It is not necessary that the saponified rosin-base material be formed in situ. It can, if desired, be prepared prior to the preparation of unstable aqueous dispersion. Thus, for example, an unstable aqueous dispersion can be prepared by mixing together the water, the rosin-base material, and a saponified rosin-base material such, for example, as sodium resinate, in an amount sufficient to provide an unstable aqueous dispersion containing the ingredients in the above amounts.

After preparation of the unstable aqueous dispersion, it is heated to a temperature of from about 150° C. to about 195° C. Agitation thereof during the time required to reach the required temperature is recommended. The heated dispersion is then subjected to extreme shear whereby there is provided an essentially stable aqueous dispersion. Extreme shear is conveniently accomplished by means of an homogenizer. Thus passing, at least once, the heated mixture through an homogenizer under a pressure of the order of from about 2000 p.s.i.g. to about 8000 p.s.i.g. will provide an essentially stable dispersion.

Some particles might form heavy agglomerates which can eventually settle out of the dispersion after a period of time. These can be easily removed, if desired, from the otherwise essentially stable dispersion by filtration, by decantation, or by other means known in the art.

The particles comprising the dispersed phase are relatively small and have a particle size of from about 0.01 micron to about 1 micron. At least about 90% by weight of the suspended particles have a particle size of less than about 0.5 micron.

When rosin is employed as a part of the rosin-base material, it can be any of the commercially available types of rosin such as wood rosin, gum rosin, tall oil rosin, and mixtures thereof, in their crude or refined state. Partially or substantially completely hydrogenated rosins and polymerized rosins, as well as rosins that have been treated to inhibit crystallization, such as by heat treatment or reaction with formaldehyde, can be used, as well as mixtures thereof.

The adduct reaction product of rosin and an acidic compound containing the

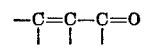

group is derived by reacting rosin and the acidic compound at elevated temperatures of from about 150° C. to 210° C. Methods of preparing these adduct reaction products are disclosed and described in Pat. 2,628,918 and 2,684,300. These adduct reaction products are often referred to in the art as Diels-Alder reaction products. The adduct reaction products are hereinafter sometimes referred to as "rosin adducts," "adducts," and "fortified rosin."

Examples of acidic compounds containing the

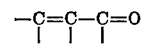

group that can be used to prepare the adducts include the α,β-unsaturated polybasic organic acids and their known anhydrides, specific examples of which include fumaric acid, maleic acid, acrylic acid, maleic anhydride, itaconic acid, itaconic anhydride, citraconic acid and citraconic anhydride.

Rosin used to prepare the adduct can be any of the commercially available types of rosin such as wood rosin, gum rosin, tall oil rosin, and mixtures thereof in their crude or refined state. Hydrogenated rosins can be used as well as rosins treated to inhibit crystallization. Also, it is possible to employ an adduct that has been substantially completely hydrogenated after adduct formation.

Suitable alkaline materials capable of forming a salt with rosin and rosin adducts include the usual inorganic and organic basic materials employed to form a saponified rosin or a saponified rosin adduct. Examples of such include lithium hydroxide, sodium hydroxide, potassium hydroxide, lithium carbonate, sodium carbonate, potassium carbonate, ammonia, and water-soluble amines such as morpholine, ethylamine, n-propylamine, and n-butylamine. Preferred alkaline materials are potassium hydroxide and sodium hydroxide.

As above set forth, salts or soaps derived by reaction of rosin or rosin adduct and an alkaline material can be used to prepare the unstable aqueous dispersion, if desired. The sodium soap of rosin is an example of such a salt or soap and can be prepared by adding a hot aqueous solution of sodium hydroxide to fused rosin and maintaining the temperature of the reaction mass at about 110° C. until reaction is substantially complete.

The rosin-base materials of which the dispersion is comprised can all be derived from the same rosin source or from different rosin sources. Thus, for example, the rosin component can be a mixture of substantially completely hydrogenated wood rosin and unrefined wood rosin, adduct component can be an adduct of unrefined wood rosin and fumaric acid, and the saponified material which functions as dispersing agent can be the sodium salt of gum rosin. In another example, rosin component can be tall oil rosin, adduct component can be the adduct of wood rosin and maleic anhydride, and the saponified material can be the potassium salt or soap of tall oil rosin. In still another example, rosin component can be a mixture of partially hydrogenated wood rosin and tall oil rosin, adduct component can be the adduct of partially hydrogenated wood rosin and fumaric acid, and the saponified material can be the potassium salt of hydrogenated wood rosin. Other and various combinations of the components will be apparent to those skilled in the art.

The aqueous dispersions prepared by the method of this invention have particular utility in the sizing of paper. In this regard, the amount of adducted acidic compound and the amount of saponified material present are important. It will be understood that substantially all of the acidic compound is reacted or adducted with rosin and is present in the form of an adduct with rosin. Thus, in the examples that follow, the amount of acidic compound present in the final product is given as percent by weight and it will all be present substantially in the adducted form.

The amount of saponified material, that is, the amount of rosin salt and/or salt of rosin adduct, present in the aqueous suspension which functions as the dispersing agent will be that which provides the desired stable dispersion. The amount of saponified material present is expressed in the specification and the claims as percent of the total number of originally available carboxyl (—COOH) groups present that have reacted to form the salt (sometimes referred to in the art as "the soap") such, for example, as the sodium salt (—COONa). For convenience, this value is set forth in the working examples as the "degree of saponification." For example, in the examples a "degree of saponification of 4%" indicates that of the originally available carboxyl groups, 4% thereof have reacted with or been saponified with alkali. The degree of saponification can vary from 0.5% to 20%; however, it is preferred to stay in the range of from about 4% to about 10%. Excess soap will detract from sizing properties. It will be appreciated that the acids of which rosin is comprised have one available carboxyl group. In the case where rosin has been reacted with an acidic compound, as above specified, to provide a fortified rosin or an adducted rosin, the reaction product will have additional available carboxyl groups as provided by the reacted acidic compound.

The following examples are illustrative of this invention. All parts and percentages are by weight unless otherwise specified.

EXAMPLE 1

Fumaric acid, 160 parts, is adducted, at elevated temperatures with fused tall oil rosin, 840 parts. The fumaric acid dissolves in the fused tall oil rosin and reacts therewith to provide a reaction mass. The reaction mass or product, after substantially all the fumaric acid has reacted with the tall oil rosin, is allowed to cool to room temperature (about 23° C.). The reaction mass is a mixture comprised of unreacted rosin and rosin-fumaric acid reaction product or adduct. The reaction product contains 16% fumaric acid, substantially all of which has been reacted. The reaction product has an acid number of 240.

EXAMPLE 2

About 850 parts of distilled hydrogenated wood rosin, about 510 parts of an adduct prepared in accordance with Example 1, 5280 parts of water, and 160 parts of 10% aqueous sodium hydroxide are admixed and heated to a temperature of about 170° C. The resulting heated mixture is passed through an homogenizer at 3000 p.s.i.g. to form a dispersion which is subsequently cooled to room temperature. The resulting dispersion has a solids content of about 16.4% and has good stability. About 6% of the solids weight is adducted fumaric acid. The degree of saponification is 7.2%.

EXAMPLE 3

About 850 parts of distilled hydrogenated wood rosin, about 510 parts of an adduct prepared in accordance with Example 1, 5215 parts of water, and 225 parts of 10% aqueous sodium hydroxide are admixed and heated to a temperature of about 170° C. The resulting heated mixture is passed through an homogenizer at 3000 p.s.i.g. to form a dispersion which is subsequently cooled to room temperature. The resulting dispersion has good stability and has a solids content of about 18.4%. About 6% of the solids weight is adducted fumaric acid. The degree of saponification is 10%.

EXAMPLE 4

About 800 parts of wood rosin, about 510 parts of an adduct prepared in accordance with Example 1, 5300 parts of water, 140 parts of concentrated $NH_4OH$ (about 29% $NH_3$) are admixed and heated to a temperature of about 175° C. The resulting heated mixture is passed through an homogenizer at 3000 p.s.i.g. to form a dispersion which is subsequently cooled to room temperature. The resulting dispersion has good stability and has a solids content of about 18.4%. About 6% of the solids weight is adducted fumaric acid. The degree of saponification is 7.1%.

EXAMPLE 5

About 1275 parts of wood rosin, about 765 parts of an adduct prepared in accordance with Example 1, 4414 parts of water, and 244 parts of 10% aqueous sodium hydroxide are admixed and heated to a temperature of about 175° C. The resulting heated mixture is passed through an homogenizer at 3000 p.s.i.g. to form a dispersion which is subsequently cooled to room temperature. The resulting dispersion has good stability and has a solids content of about 16.9%. About 6% of the solids weight is adducted fumaric acid. The degree of saponification is 7.1%.

EXAMPLE 6

About 1024 parts of 6% fumaric acid adduct of formaldehyde treated tall oil rosin, 5523 parts of water, and 253 parts of 10% aqueous sodium hydroxide are admixed and heated to a temperature of about 170° C. The resulting heated mixture is passed through an homogenizer at 3000 p.s.i.g. to form a dispersion which is subsequently cooled to room temperature. The resulting dispersion has good stability and has a solids content of about 14.3%. About 6% of the solids weight is adducted fumaric acid. The degree of saponification is 15%.

The sizing efficiency of each of the aqueous suspensions of Examples 2, 3, 4 and 6 is tested by preparing handsheets using varying amounts of size solids. To prepare the handsheets, Rayonier bleached kraft pulp is suspended in standard hard water and beaten to 750 ml. S-R freeness in a Noble and Wood cycle beater. Size additions are made to 2-liter portions of the beaten slurry which has been diluted to 2.5% solids by weight. Sufficient alum is added to each sized slurry to provide a pH of about 4.5, and the slurry is then diluted to a consistency of 0.27% in the proportioner, using acid-alum dilution water.

The dilution water is prepared by reducing the pH of water of moderate hardness to 5.0 with sulfuric acid, then adding enough alum to provide 5 p.p.m. soluble aluminum. One-liter portions of proportioner pulp slurry are diluted further with acid-alum dilution water to a deckle box consistency of 0.025% in order to form 40-pound basis weight (24" x 36"—500 sheet ream) handsheet using a Noble and Wood sheetmaking apparatus. A closed white water system is employed. Formed sheets are wet-pressed to 33% solids content and then dried to 240° F. on a steam drum drier. All handsheets are conditioned for two days at 72° F. and 50% relative humidity and are tested in this environment. Resistance to penetration by Test Ink No. 2 is determined by use of the Hercules Sizing Tester. The time necessary for ink penetration to reduce light reflectance to 80% of the sheet's initial value is used to represent the degree of sizing.

Table I below sets forth photometer sizing results for the sizes of the examples at a size concentration of 0.5%. The size concentration is by weight and is based on the weight of the dry pulp. Thus, for example a 0.5% size concentration indicates that 0.5% by weight of the solids content of the aqueous suspension of the specified example, based on the weight of the dry pulp, is added.

TABLE I

| Size of Example: | Photometer sizing as a function of size concentration, 0.5% |
|---|---|
| 2 | 124 |
| 3 | 115 |
| 4 | 132 |
| 6 | 121 |

The term "consisting essentially of" as used in the claims excludes any unrecited substance at a concentration sufficient to substantially adversely affect the essential properties and characteristics of the composition defined, while permitting the presence of one or more unrecited substances at concentrations insufficient to affect adversely said essential properties and characteristics.

It is to be understood that the above description and working examples are illustrative of this invention and not in limitation thereof.

What I claim and desire to protect by Letters Patent is:

1. A process for preparing an essentially stable aqueous dispersion of rosin-base material adapted for use in the sizing of cellulosic papermaking fibers which consists essentially of homogenizing under a pressure of from about 2000 p.s.i.g. to about 8000 p.s.i.g. an unstable aqueous dispersion heated to a temperature of from about 150° C. to about 195° C. said aqueous dispersion consisting essentially of, by weight, about 95% to about 75% water and about 5% to about 25% solids, the solids consisting essentially of, by weight, from 0% to about 95% rosin and from 100% to about 5% of an adduct reaction product of rosin and an acidic compound containing the

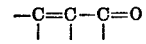

group, the amount of adducted acidic compound being from about 1% to about 20% of the total solids weight, a relatively small amount of the rosin-base material being saponified, the amount thereof, represented as a percentage of avilable carboxyl groups of the rosin-base material saponified being from about 0.5% to about 20%.

2. The process of claim 1 wherein the solids content is from about 10% to about 20% and the water content is from about 90% to about 80%.

3. The process of claim 1 wherein the amount of saponified rosin-base material is from about 4% to about 10%.

4. The process of claim 1 wherein the solids content is from about 10% to about 20% and the water content is from about 90% to about 80%, the solids consisting essentially of, by weight, from 0% to about 85% rosin and from 100% to about 15% adduct reaction product, wherein the amount of adducted acidic compound is from about 4% to about 8% and wherein the amount of saponified rosin-base material is from about 4% to about 10%.

References Cited

UNITED STATES PATENTS

| 3,565,755 | 2/1971 | Davison | 106—238 |
| 2,842,453 | 7/1958 | Anderson et al. | 106—238 |
| 1,958,470 | 5/1934 | De Crew | 106—238 |
| 2,383,933 | 9/1945 | Bump | 106—238 |
| 2,326,610 | 8/1943 | Borglin | 252—311.5 |

THEODORE MORRIS, Primary Examiner